(No Model.)  3 Sheets—Sheet 1.
R. MURPHY.
PLANTER.
No. 492,096. Patented Feb. 21, 1893.
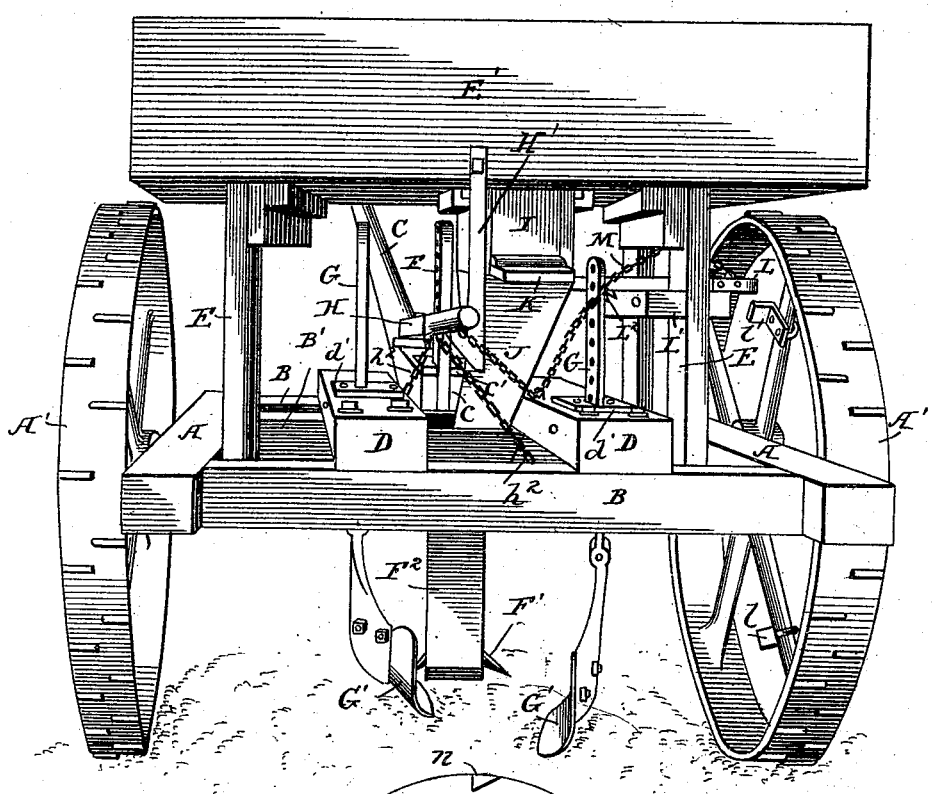
Fig. 1.
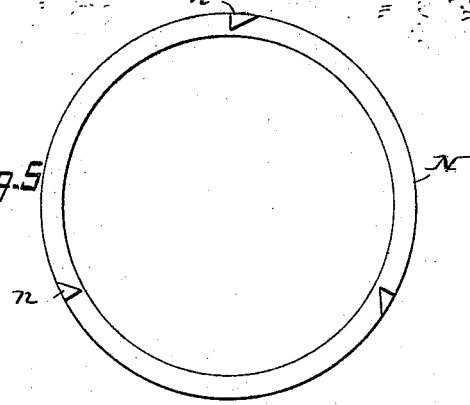
Fig. 3.
Fig. 4.
Witnesses  
Inventor  
Robert Murphy,  
By J. B. Sawyer,  
Attorney (No Model.) 3 Sheets—Sheet 2.
R. MURPHY.
PLANTER.
No. 492,096. Patented Feb. 21, 1893.
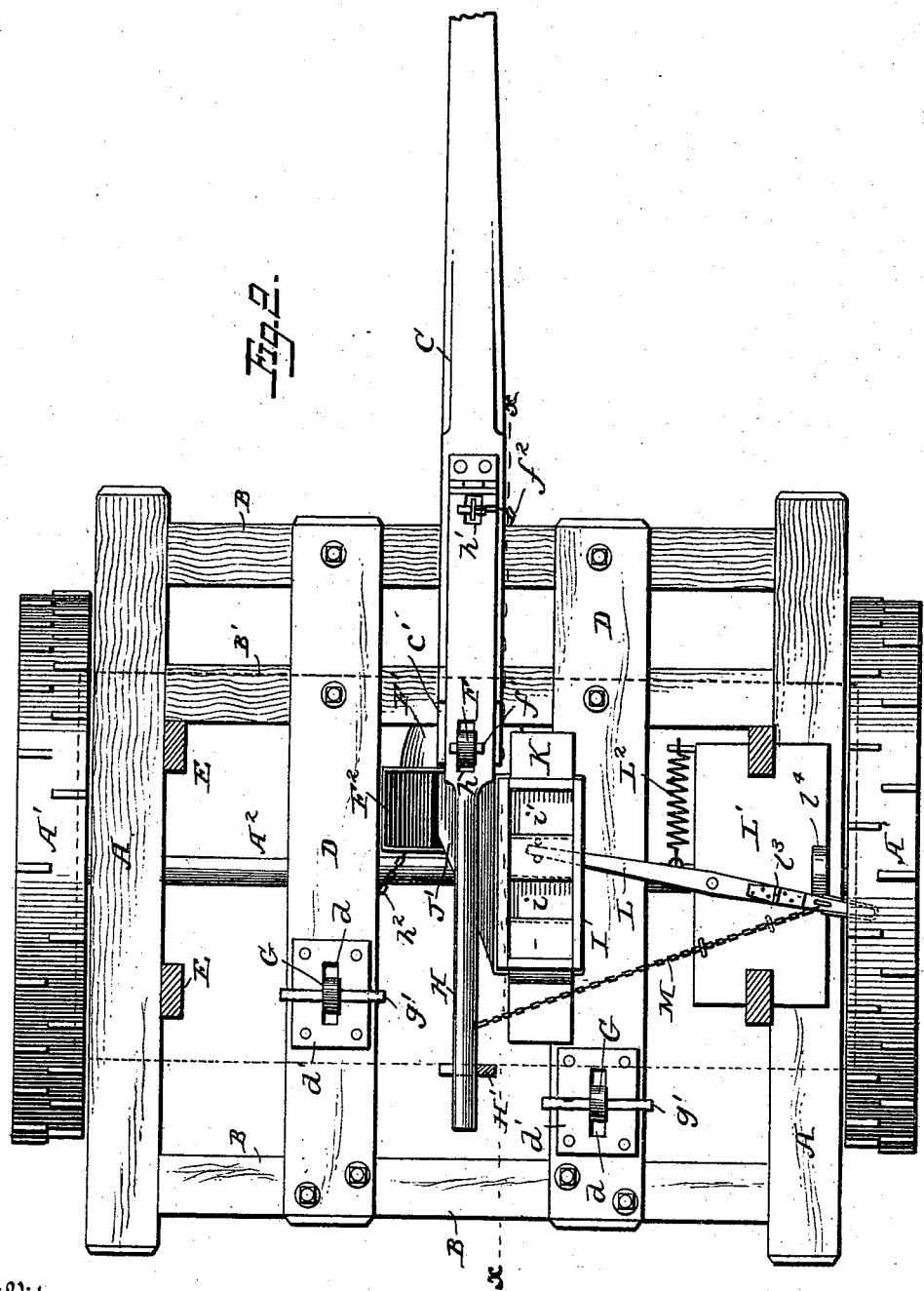
Witnesses
Inventor
Robert Murphy.
By J. B. Sawyer,
Attorney (No Model.)  3 Sheets—Sheet 3.
R. MURPHY.
PLANTER.
No. 492,096.  Patented Feb. 21, 1893.
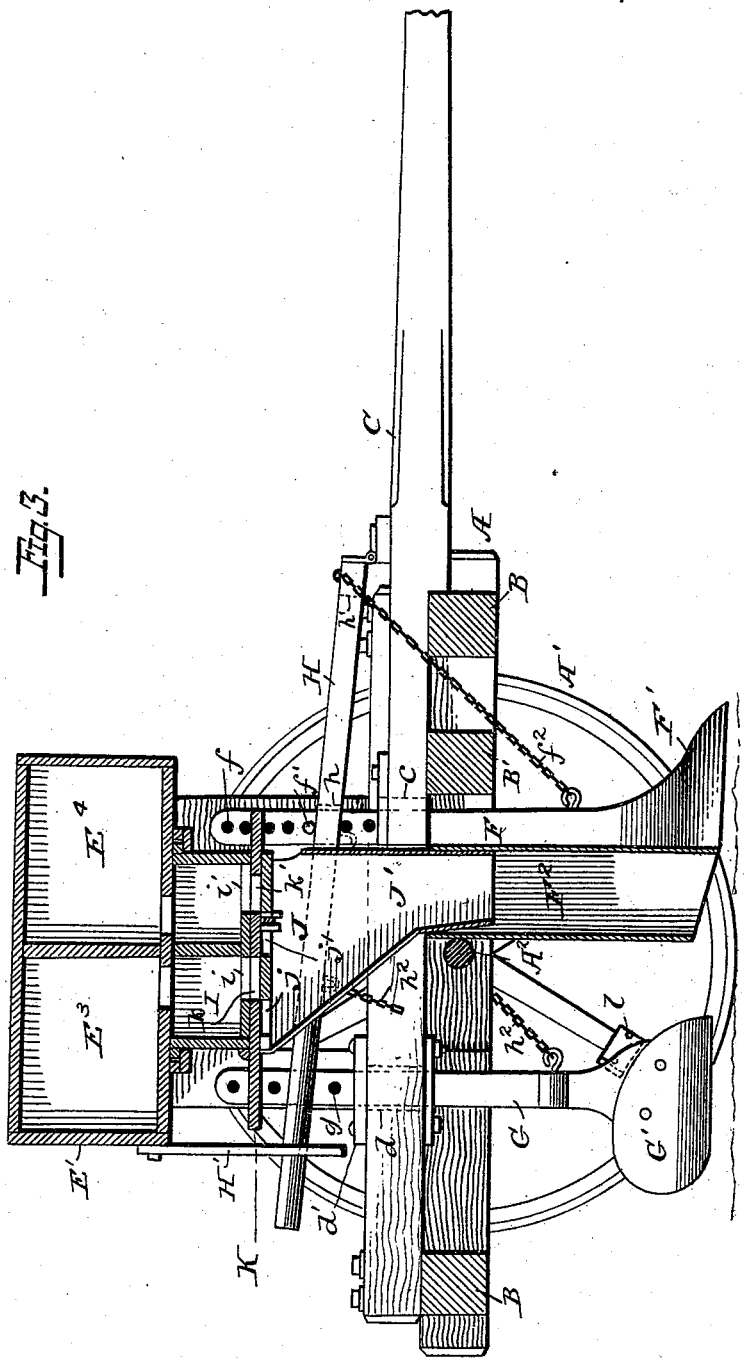
Witnesses
J. M. Fowler Jr.
Severance
Inventor
Robert Murphy.
By J. B. Sawyer,
Attorney

UNITED STATES PATENT OFFICE.

ROBERT MURPHY, OF CANISTEO, NEW YORK.

PLANTER.

SPECIFICATION forming part of Letters Patent No. 492,096, dated February 21, 1893.

Application filed August 10, 1892. Serial No. 442,687. (No model.)

*To all whom it may concern:*

Be it known that I, ROBERT MURPHY, a citizen of the United States, residing at Canisteo, in the county of Steuben and State of New York, have invented certain new and useful Improvements in Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of planters wherein the feeding of the seed, grain &c., is governed by the movement of a reciprocating gate or slide actuated by the revolution of the bearing wheels as the planter is moved, and wherein the planting mechanism is adapted to be raised in order to afford greater facilities for transportation, my device being especially applicable to the planting of potato-sprouts, and for the purpose of making such a machine which will be cheap, efficient and durable, my invention consists in the construction, arrangement and combination of the several parts of which it is composed, as will be hereinafter more fully described and claimed.

Referring to the accompanying drawings, in which similar parts are designated by similar marks of reference, Figure 1, is a rear view of a planter constructed in accordance with my invention. Fig. 2, is a plan view thereof with the top box removed. Fig. 3, is a longitudinal section on line $x$—$x$ of Fig. 2. Fig. 4, is a detail view of the trip lever. Fig. 5, is a detail view of a wheel having a modified form of tripping mechanism thereon.

The frame, consisting of the side pieces A, A, and the transverse end pieces B, B, is carried by the wheels A', having a broad tread, which wheels are mounted on the axles $A^2$, projecting from the outer side of each of the side pieces A. An intermediate transverse piece B' runs parallel to, and near the forward transverse piece B, it having its ends secured to side pieces A, as are the ends of the pieces B. To the front piece B, and to the intermediate piece B' the rear of a suitable tongue C, is secured, the rear of the said tongue in the rear of the intermediate piece B' being slotted as at $c$ and shod with a similar slotted iron $c'$ to prevent wear. Upon the tops of the transverse pieces B, and B' and intermediate of their ends, are secured the longitudinal pieces D, which have slots $d$, at, or near their centers, which are protected by guard irons $d'$. Standards E, secured to the frame formed by the pieces, A, and B, carry upon their upper ends a top box E', which serves both, as a seat for the driver and as a receptacle for fertilizer seeds &c, from which the feed box (hereinafter described) is replenished.

The post F which is provided with a series of perforations or eyes $f$ forms an upward continuation of the furrow opener F', which, when in use enters the ground, and throws it on each side, while the hollow feed leg $F^2$, having an enlarged upper end is secured in the rear of the said post which passes through the slot $c$ in the tongue, by which it is guided.

A post G, passes through the slot $d$ in each of the intermediate longitudinal pieces D, each of the said posts having a series of eyes, $g$, therein, and carrying upon its lower end a hiller blade G', each of which being upon a side of the line of the trencher, and in the rear thereof, throws back the earth removed thereby, thus covering whatever may have been fed from the leg $F^2$, while pins $f'$, and $g'$, are adapted to be inserted in the eyes $f$ and $g$, in the posts F, and G respectively, and by bearing on the upper surface of the tongue C, and intermediate pieces D, regulate the depth to which the furrow opener and hillers may enter the ground. A lever H, has its forward end pivoted to the tongue C, in front of the slot $c$, thereon, and extends rearwardly to the rear of the machine, it having a slot $h$ therein, through which the upper end of the post F, passes. Upon the rear end of the lever are secured chains $h^2$, that have their opposite ends secured to the posts G, near the base thereof, while a chain $f^2$ is connected to the lower end of the post F and passes through the forked iron $h'$ on the forward end of the lever H, the slack of the said chain $f^2$ being regulated by inserting different links between the forks of the iron $h'$, whereby upon lifting the rear end of the lever H, and catching upon the hook H', depending from the top box E', the furrow opener and hillers will be lifted out of the ground, and held raised for convenience, in moving the planter until the lever is disengaged and lowered. The feed box I, is located below the top box E', and has its interior divided into two compartments, one receiving seed, and the other fertilizers, which are fed thereto by gravity from the corresponding divisions $e^3$ and $e^4$ of the top box each of the said compartments having a post $i$, and $i'$, respectively in its bottom, the two parts being in line and over a box J, which has also two apertures $j, j'$ in its top, neither of the said apertures being in line with the apertures in the feed box, between the bottom of which, and the top of the box J, a valve K, provided with two apertures $k, k'$, is reciprocated. It will be seen that as this valve is moved to and fro, when the apertures $k, k'$, therein are under the apertures $i, i'$, in the feed box, the contents of the latter will fall into the said apertures $k, k'$, and that when the apertures $k\ k'$, are over the apertures $j, j'$, in the box J, the contents thereof will fall into the said box, and down through the chute J', secured thereto, into the leg $F^2$, and thus into the trench made by the furrow opener.

In order to actuate the valve, K, it has upon the lower surface two pins between which the inner end of a trip lever L, passes the opposite end of the said lever which is pivoted to a cross piece L', carried by the standards E, being struck by lugs or ears $l$ adjustably secured to the spokes of one of the wheels A', the said lever being normally so thrown by the coil spring $L^2$, that its projecting end is at the rear end of its path where it will be first struck by the lugs $l$, upon a rotation of the wheel due to the forward movement of the planter. As it is desirable that the lever be shoved by the lug through a comparatively large path, I make the lever in two parts hinged at $l^3$, so that the projecting part may move vertically on its pivot, and place upon the cross piece L', an arc shaped track $l^4$, over which the projecting portion of the lever is cammed by the lug engaging therewith, whereby the end of that portion of the lever moves in an arc of a circle, until it is released by the ear going below the level of the cross-piece L', when it is thrown back by the spring $L^2$, to its first position to engage the succeeding lug upon the wheel, the weight of the projecting end being sufficient to hold it down when not thrown up by the track $l^4$. I also attach to the projecting end of the lever L, a cord or chain M, which passing over suitable bearings in the tops of the standards E, and on the intermediate piece D, has it opposite end brought up and connected to the lever H, so that when the lever is raised to raise the furrow opener and hillers the end of the said lever will also be raised out of the path of the lugs upon the revolving wheel, thus cutting off the feed as is desired when moving the cultivator from place to place.

Instead of using lugs secured directly to the spokes of the wheel for actuating the trip lever, I may use the alternative form shown in Fig. 5, which consists of a ring N, having a series of lugs $n$, thereon, and being secured to the wheel A', by yokes $n'$ surrounding the spokes thereof. As several of such rings may accompany each machine and be differently spaced between these lugs, a ready means for regulating the distance between the successive hills is afforded.

Having thus described my invention, what I claim is—

1. The combination with a suitable framework, of a tongue attached thereto, and having its rear end slotted, slotted intermediate longitudinal pieces carried by the said frame, a perforated post passing through the slot in the said tongue, and having a furrow opener blade upon its base, a perforated post passing through the slots in said intermediate pieces, each of the said last named posts having a hiller blade on the base thereof, a lever pivoted to the said tongue, and connected to the first named post, and chains connected to the last named uprights and the said lever, substantially as described.

2. In a wheeled planter, the combination with a feed box having a perforated base, of an apertured valve, moving below the said box, a tripping lever composed of two horizontally pivoted parts, one of which is connected with the said trip lever, an arc-shaped track adapted to raise the opposite end of the said lever, and lugs upon the wheel to strike the last named end of the trip lever, substantially as described.

3. The combination in a wheeled planter, of furrow opener and hiller blades, of a lever connected thereto and adapted to lift them from out the ground, a feed box having a perforated bottom, an apertured valve moving below the said bottom, a tripping lever composed of two horizontally pivoted parts, one of which is connected with the said tripping lever, lugs upon the wheel, adapted to strike the opposite portion of the tripping lever, and a connection between the last named portion of the tripping lever and the first named lever, whereby the end of the said tripping lever will be raised, upon raising the first named lever, substantially as described.

In testimony whereof I affix my signature in presence of two witnesses.

ROBERT MURPHY.

Witnesses:
CALVIN ANDROS,
NELSON S. HALLETT.